(12) United States Patent
Khanduri (10) Patent No.: US 8,559,320 B2
(45) Date of Patent: Oct. 15, 2013

(54) METHOD AND APPARATUS FOR MEASURING VOICE QUALITY ON A VOIP NETWORK

(75) Inventor: Prakash Khanduri, Freehold, NJ (US)

(73) Assignee: Avaya Inc., Basking Ridge, NJ (US)

(*) Notice: Subject to any disclaimer, the term of this patent is extended or adjusted under 35 U.S.C. 154(b) by 956 days.

(21) Appl. No.: 12/050,991

(22) Filed: Mar. 19, 2008

(65) Prior Publication Data

US 2009/0238085 A1    Sep. 24, 2009

(51) Int. Cl.
*H04L 12/26* (2006.01)

(52) U.S. Cl.
USPC ........ 370/252; 370/230; 370/235; 370/395.2; 348/14.01

(58) Field of Classification Search
USPC ......... 370/252, 356, 253, 338, 250, 493–495, 370/282, 232, 352, 230; 704/201, 233; 709/224, 230; 348/14.12
See application file for complete search history.

(56) References Cited

U.S. PATENT DOCUMENTS

| | | | |
|---|---|---|---|
| 5,710,981 A * | 1/1998 | Kim et al. | 455/69 |
| 6,275,797 B1 * | 8/2001 | Randic | 704/233 |
| 6,389,005 B1 * | 5/2002 | Cruickshank | 370/352 |
| 6,741,569 B1 | 5/2004 | Clark | |
| 7,024,475 B1 * | 4/2006 | Abaye et al. | 709/224 |
| 7,058,048 B2 | 6/2006 | Clark | |
| 7,075,981 B1 | 7/2006 | Clark | |
| 7,092,369 B2 * | 8/2006 | Fuccello et al. | 370/328 |
| 7,295,549 B2 * | 11/2007 | Pepin et al. | 370/352 |
| 7,305,478 B2 * | 12/2007 | Willins et al. | 709/229 |
| 7,327,985 B2 * | 2/2008 | Morfitt et al. | 455/67.11 |
| 7,508,817 B2 * | 3/2009 | Huang et al. | 370/352 |
| 7,551,565 B2 * | 6/2009 | Stieglitz et al. | 370/241 |
| 7,720,959 B2 * | 5/2010 | Karam et al. | 709/224 |
| 7,843,842 B2 * | 11/2010 | Ethier et al. | 370/248 |
| 8,019,352 B2 * | 9/2011 | Rappaport et al. | 455/456.1 |
| 8,248,953 B2 * | 8/2012 | Kumar et al. | 370/242 |
| 2002/0077138 A1 * | 6/2002 | Bark et al. | 455/522 |
| 2003/0128692 A1 * | 7/2003 | Mitsumori et al. | 370/352 |
| 2003/0232630 A1 * | 12/2003 | Wilhelm | 455/552.1 |
| 2004/0022203 A1 * | 2/2004 | Michelson et al. | 370/282 |
| 2004/0058652 A1 * | 3/2004 | McGregor et al. | 455/67.13 |
| 2004/0073690 A1 * | 4/2004 | Hepworth et al. | 709/230 |
| 2004/0128123 A1 * | 7/2004 | Kashiwagi | 704/201 |
| 2005/0047340 A1 * | 3/2005 | Babiarz et al. | 370/231 |
| 2005/0122903 A1 * | 6/2005 | Hultgren et al. | 370/230 |
| 2006/0109786 A1 * | 5/2006 | Abdel-Kader et al. | 370/232 |
| 2006/0153174 A1 * | 7/2006 | Towns-von Stauber et al. | 370/356 |
| 2006/0209803 A1 * | 9/2006 | Rajaniemi et al. | 370/352 |
| 2007/0004466 A1 * | 1/2007 | Haartsen | 455/572 |
| 2007/0026803 A1 * | 2/2007 | Malm | 455/63.1 |
| 2007/0058546 A1 * | 3/2007 | Na | 370/230 |
| 2007/0107034 A1 * | 5/2007 | Gotwals | 725/129 |
| 2007/0120950 A1 * | 5/2007 | Jokimies et al. | 348/14.01 |
| 2007/0127391 A1 * | 6/2007 | Goodman | 370/252 |
| 2007/0248012 A1 * | 10/2007 | Glinsman et al. | 370/232 |

(Continued)

*Primary Examiner* — Michael Thier
*Assistant Examiner* — Vincelas Louis
(74) *Attorney, Agent, or Firm* — Muncy, Geissler, Olds & Lowe, PLLC (57) ABSTRACT

In a method and apparatus for measuring voice quality of an endpoint in a Voice-over-IP (VoIP) network, a plurality of network quality parameters are determined for the endpoint. A voice quality factor for the endpoint is determined in real time based on the network quality parameters.

7 Claims, 4 Drawing Sheets

(56) References Cited

U.S. PATENT DOCUMENTS

| | | | |
|---|---|---|---|
| 2008/0055399 A1* | 3/2008 | Woodworth et al. | 348/14.12 |
| 2008/0062887 A1* | 3/2008 | Parolkar et al. | 370/252 |
| 2008/0137552 A1* | 6/2008 | Lee et al. | 370/252 |
| 2008/0212537 A1* | 9/2008 | Bukai | 370/332 |
| 2010/0238834 A9* | 9/2010 | Awais | 370/253 |
| 2010/0273486 A1* | 10/2010 | Kharia et al. | 455/436 |

* cited by examiner

FIG. 1

BACKGROUND ART

FIG. 2

BACKGROUND ART

METHOD AND APPARATUS FOR MEASURING VOICE QUALITY ON A VOIP NETWORK

BACKGROUND

1. Field of the Invention

Example embodiments of the present invention generally relate to a method and apparatus for measuring voice quality in a VoIP network.

2. Description of Related Art

Distributed processing networks for live voice communications between network nodes use Voice over IP (VoIP) technology. In a VoIP system, after the speech is digitized, the digitized speech is divided into packets. Each packet includes a header and a data payload of one to several frames of encoded speech. Distributed processing networks for delivering the packets to desired endpoints are typically designed to provide a Best Effort (BE) single service model that does not discriminate in packet delivery between services and does not control service access or quality.

Quality of Service (QoS) architectures have been developed for BE environments to provide guaranteed transmission characteristics end-to-end, such as available bandwidth, maximum end-to-end delay, maximum end-to-end delay variation (jitter), and packet/cell loss levels to provide continuous data streams suitable for real-time phone calls and video conferencing. These QoS architectures include protocols such as the Resource ReSerVation Protocol (RSVP) and the Real-Time Transfer Protocol (RTP).

RSVP is a signaling protocol that guarantees receivers a requested end-to-end QoS. RSVP serves as an Internet signaling protocol through the transmission of QoS parameters. Under RSVP, an endpoint negotiates with the network to allocate or reserve protected resources for traffic that the endpoint will generate or receive. The two messages that perform the reservation request and installation are the Path and Resv messages. Robustness is achieved through maintaining a soft state network by transmitting periodic refresh messages to maintain a reservation and path state along the reservation path. If the intermediate nodes do not receive the refresh message, the reservation will time out and be deleted.

RTP is a voice bearer channel transfer protocol. RTP neither guarantees a QoS nor provides for resource reservations. RTP runs on the transport layer of the Open Systems Interconnection (OSI) model and defines a session by two components, namely its profile and payload format, where the payload is the data being transmitted. The payload format specifies the format of the data within the RTP packet such as encoding and compression schemes. RTP functions include loss detection for quality estimation and rate adaptation, sequencing of data, intra- and inter-media synchronization, session identification using a session id, source identification using a synchronization source id or SSRC, and basic membership information.

The Real-Time Control Protocol (RTCP), a companion protocol to RTP, is used by applications to monitor the delivery of RTP streams. Media packets are transmitted between endpoints during a session according to RTP while additional performance information governing the communication link (e.g., key statistics about the media packets being sent and received by each endpoint such as jitter, packet loss, round-trip time, etc.) are collected by the endpoints and transmitted to a session monitor according to RTCP. The network monitor can be, for example, VoIP Monitoring Manager™ or VMon™ by Avaya, Inc.

Under either the RSVP or RTP protocols, VoIP introduces a range of QoS problems which were not previously significant or, in some cases, even encountered in circuit-switched networks. Voice telephony depends upon reliable, low latency, real-time delivery of audio data. In VoIP, values for latency, packet loss, and jitter can increase substantially, particularly during periods of heavy network traffic. This can cause a user to experience a much poorer quality of communication (e.g., audio or video distortion, unacceptable levels of synchronization between audio and video streams, etc.) than would be experienced if the call were made by a traditional circuit-switched telephony network.

Figure 1:
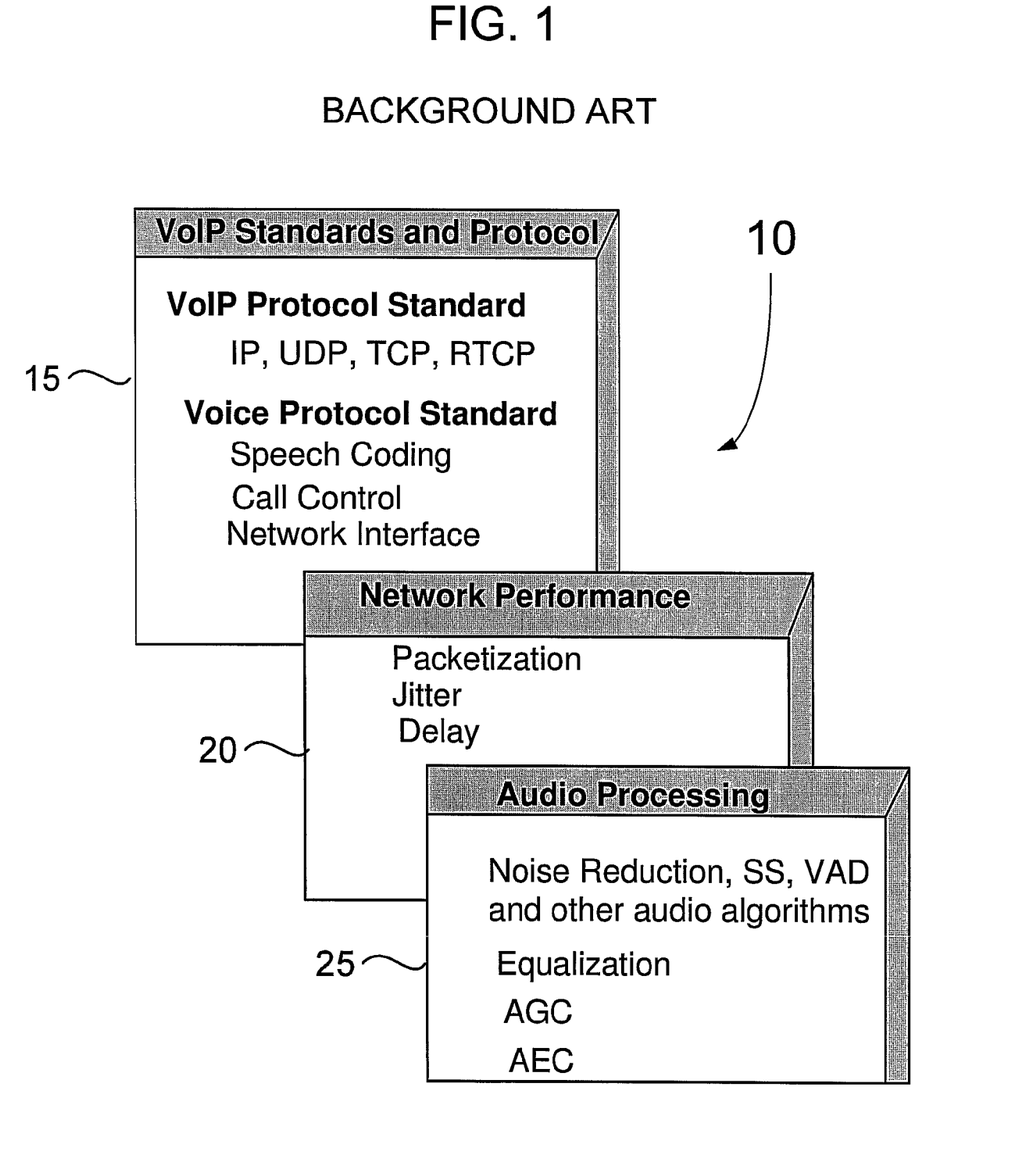
FIG. 1 illustrates building blocks of a conventional VoIP system.

FIG. 1 illustrates building blocks of a conventional VoIP system 10. These building blocks are divided into three categories. The topmost block 15, known as the network layer, includes VoIP protocols and voice coder standards. These are standard components and are used by all VoIP manufacturers; thus components in the network layer cannot be a differentiator for voice quality in VoIP system. The network performance block 20 and audio processing block 25, however, are not standard in a typical VoIP system. The design and implementation of blocks 20 and 25 along with the platform could make a difference in the voice quality of a VoIP system.

Figure 2:
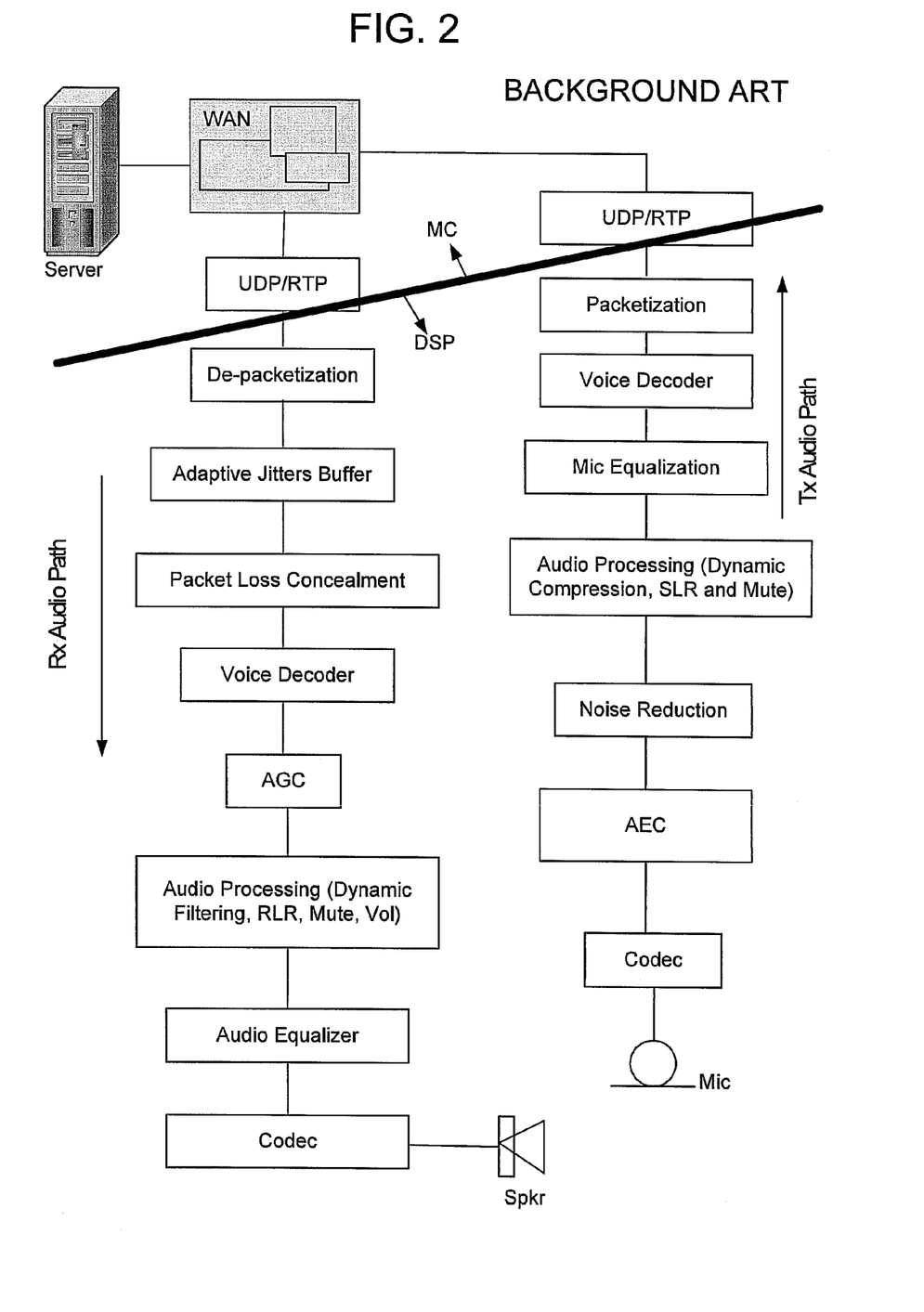
FIG. 2 is a block diagram to illustrate the receive and transmit processing blocks of a conventional VoIP endpoint.

FIG. 2 is a block diagram to illustrate the receive and transmit processing blocks of a conventional VoIP endpoint such as an IP-phone. Each block represents an algorithm or series of functions. The received path includes algorithms related to Jitter Buffer, packet loss concealment (PLC), comfort noise generation, automatic gain control (AGC) and audio equalization, each of which play a role in VoIP receive voice quality. The transmit path includes acoustic echo cancellation (AEC), dynamic compression, mic equalization/expansion, voice activity detection (VAD), silence suppression (SS), double talk detection and noise reduction algorithms. Each of these algorithms play a role in VoIP transmit voice quality.

Delivering and maintaining optimal voice quality is desired by all designers, network engineers, and manufacturers of components in VoIP systems. Hybrid systems, transcoding and inherent delays in the VoIP system have introduced many challenges in attempting to maintain circuit-switch-type voice quality. For example, voice quality can become degraded due to a number of factors, including VoIP CODECS (inherently, there is at least some quality loss), distortion, network impairments such as packet loss and jitter, packet delay or latency, and background noise.

Distortion in either the analog or digital path can play a significant role in voice quality degradation. In the analog domain, distortion can introduce non-linearity in the echo path, which can cause clipping and poor echo performance. Distortion in the analog and digital paths could also affect speech coder performance.

Packet loss causes degradation in voice quality and typically occurs in bursts of 20-30% loss lasting 1-3 seconds. This may mean that the average packet loss rate for a call appears low, although the user reports call quality problems. Packet loss can occur for a variety of reasons including link failure, high levels of congestion that lead to buffer overflow in routers, Random Early Detection (RED), Ethernet problems, and the occasional misrouted packet. For example, packets can be lost when they encounter a queue in a router which is completely full, or when they are subject to policy-based discard, e.g., they are out-of-profile of their SLA.

Jitter refers to how variable latency (end-to-end delay variations) is in a network. Jitter greater than approximately 50 milliseconds can result in both increased latency and packet loss. Excessive jitter can result from congestion on LANs, access links, low bandwidth WAN links/trunks or the use of load sharing. For example, packets accumulate jitter when encountering varying router queue occupancies on their path through the network. As a result, these packets incur a different overall delay than that of their predecessors or successors. This skews the timing relationships between successive packets.

Jitter levels under 100 milliseconds may be acceptable if jitter buffer size in the endpoint is increased. For jitter levels exceeding 100 milliseconds, increasing the jitter buffer size to avoid packet discards introduce significant delay and cause conversational problems.

A jitter buffer in the endpoint temporarily stores arriving packets in order to minimize delay variations. If packets arrive too late then they are discarded. A jitter buffer may be mis-configured and/or could be either too large or too small. If a jitter buffer is too small, then an excessive number of packets may be discarded, which can lead to call quality degradation. If a jitter buffer is too large, then the additional delay can lead to conversational difficulty. A typical jitter buffer configuration is 30 milliseconds to 50 milliseconds in size. In the case of an adaptive jitter buffer, the maximum buffer size can be set to 100-200 milliseconds.

Latency, or packet delay, is a measure of the delay in a call. Both the round-trip delay between when information leaves point A and when a response is returned from point B, and the one-way delay between when something was spoken and when it was heard, is measured. The largest contributor to latency is typically caused by network transmission delay. High levels of delay (generally over 200 milliseconds round trip) can cause problems with conversational interaction. This may be due to the routing of the IP stream, mis-configuration of the jitter buffer (i.e., too large) at either end of the connection or high levels of jitter which are causing an adaptive jitter buffer to grow excessively large. For example, packets are delayed when they are processed (e.g., through encryption gateways), when they encounter non-empty queues in routing devices, and in play-out buffers (jitter removal). For delay exceeding 300 milliseconds, users may experience annoying talk-over effects.

The transmission of background noise is a critical parameter to control for naturalness of a conversation. Therefore, it is desirable to have a proper signal to noise ratio (SNR) for intelligible conversation and echo control.

Accordingly, one concern in a VoIP system is to provide a high voice quality, which necessitates an accurate measurement of voice quality. Moreover, a new challenge presenting designers and network engineers of VoIP systems is to determine an accurate way to measure voice quality during live calls. Conventional voice quality measuring techniques fall in four primary categories: subjective testing, P.862 (PESQ) testing, non-intrusive testing, and testing via the E-Model (ITU standard G.107).

Subjective testing is widely considered the most "authentic" method of measuring voice quality. However, subjective testing is a specialized and costly process. This approach is typically used by CODEC designers and equipment manufacturers to validate VoIP technology prior to deployment. A Mean Opinion Score (MOS) ranges from 1 for an unacceptable call to 5 for an excellent call. A typical range for VoIP would be from 3.5 to 4.2. A score of 5 is not obtainable as the VoIP codecs inherently introduce some amount of quality loss.

Perceptual Evaluation of Speech Quality (PESQ) is a mechanism for automated assessment of the speech quality enjoyed by the user of a telephony system. It is standardized as ITU-T recommendation P.862. P.862 (PESQ) is used to analyze the distortion that has occurred on test voice signals that have been transmitted through a VoIP network, and to produce an estimated MOS score. These algorithms are implemented in test equipment available from a number of companies. The advantage of the P.862 algorithm is that the algorithm measures the effects of much different impairment and their interactions. A disadvantage is that P.862 requires a call to be set up through the network for each test.

Non-intrusive or passive monitoring testing examines a stream of voice traffic and produces a transmission quality metric that can be used to estimate a MOS score. This has an advantage in that all calls in a network can be monitored without additional network overhead. However, a disadvantage of passive monitoring testing is that the effects of some impairments are not incorporated into the testing algorithm. Conventional non-intrusive or passive monitoring testing includes VQmon™, P.563 and E-model techniques.

VQmon™, a product of Telchemy Incorporated of Duluth, Ga., is a multi-platform, multi-vendor technology for measuring the quality of IP services and providing diagnostic data for problem resolution. VQmon/EP is designed for integration into endpoints such as IP Phones and IP Gateways. VQmon/SA is designed for use in stream analysis and is typically used as the core VoIP analysis software in analyzers, probes, routers, and service level agreement (SLA) monitors. VQmon provides passive monitoring through observation of the RTP stream and incorporates effects such as packet loss burstiness. This produces an R-factor, which is a metric that uses a formula to take into account both user perceptions and the cumulative effect of equipment impairments to arrive at a numeric expression of voice quality. The R-factor can be used to estimate a MOS score. VQmon can be embedded into VoIP Gateways and other end systems with virtually no impact on equipment cost or network traffic.

P.563 is a passive monitoring algorithm that analyses the voice stream in order to estimate call quality scores. As the P.563 algorithm is much more computationally complex (over 1000×) than VQmon, it is typically only used on a sampling basis. P.563 is one of a number of "analog" signal analysis tools used to measure signal distortion levels and identify problems affecting voice quality. P.563 produces inaccurate results for individual calls and is typically used for producing estimates of service quality when aggregated over many calls.

The E Model was originally developed within the European Telecommunications Standards Institute (ETSI) as a transmission planning tool, described in ETSI technical report ETR 250, and then standardized by the ITU as G. 107. The objective of the model was to determine a quality rating that incorporated the "mouth to ear" characteristics of a speech path. The range of the R factor is nominally from 0-100; however, values of below 50 are generally unacceptable, and typical telephone connections do not get above 94, for a typical range of 50-94. For wideband CODECs the R-factor may increase above 100, and is typically 110 for an unimpaired connection. The basic model is:

$$R = Ro - Is - Id - Ie + A + W \qquad \text{Equation (1)}$$

In Equation (1), Ro is a base factor determined from noise levels, loudness, etc. Is represents impairments occurring simultaneously with speech; Id represents impairments that are delayed with respect to speech, Ie represents an "equipment impairment factor", variable. The variable A is an "advantage factor" and the variable W is a wideband correction factor.

The equipment impairment factor, Ie, is typically used to represent the effects of Voice over IP. For example, assuming default values for the other factors, the R-factor for an "ideal" G.729A connection with no packet loss, jitter or jitter buffer delay would be R=Ro−Ie=94−11=83. The advantage factor, A, is used to represent the convenience to the user of being able to make the phone call, i.e., a cell phone is convenient to use, therefore users are more forgiving on quality.

The conventional voice quality measuring techniques do not measure voice quality during a live call. The conventional voice quality measurements are performed prior to installation, made as an estimate of aggregated calls, or are calculated by monitoring a stream of voice traffic to determine an R-factor that can be used to estimate a MOS score. This is due in part to the fact that measuring voice quality during live calls is inherently complicated. A desired voice quality measurement algorithm has to account for the dynamic nature of the speech signal, the dynamic nature of the acoustic environment, and the dynamic nature of the VoIP channel.

SUMMARY

An example embodiment is directed to a method of measuring voice quality of an endpoint in a Voice-over-IP (VoIP) network. The method includes determining a plurality of network quality parameters of the endpoint, and determining a voice quality factor for the endpoint in real time based on the network quality parameters.

Another example embodiment is directed to a method of determining voice quality of an endpoint in a Voice-over-IP (VoIP) network. In the method, a plurality of network quality parameters of the endpoint are input into a lookup table stored in the endpoint. A predefined voice quality factor is selected from the lookup table based on the inputs.

Another example embodiment is directed to an apparatus in a Voice-over-IP (VoIP) network. The apparatus includes a processor for determining a plurality of network quality parameters of the apparatus, and a controller for determining a voice quality factor for the endpoint in real time based on the network quality parameters received from the processor.

Another example embodiment is directed to an apparatus in a Voice-over-IP (VoIP) network. The apparatus includes a processor, and a controller having a lookup table stored therein. The processor inputs a plurality of network quality parameters of the apparatus into the lookup table, and the controller selects a predefined voice quality factor from the lookup table based on the inputs.

Another example embodiment is directed to a computer-readable medium. The computer-readable medium includes instructions that cause a programmable processor to input a plurality of network quality parameters into a lookup table stored in an endpoint of a Voice-over-IP (VoIP) network, and to select a predefined voice quality factor from the lookup table based on the inputs.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus do not limit the example embodiments.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "example" is used herein to mean "serving as an instance or illustration." Any embodiment described herein as "example" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The example embodiments to be described hereafter relate to a method and apparatus for measuring voice quality in a VoIP network. The example method and apparatus evaluate a plurality of network quality parameters to determine a voice quality metric of an endpoint during a live call. The determination may be done dynamically during the live call, and voice quality information may be transmitted to the network for evaluation and monitoring of the endpoint.

Figure 3:
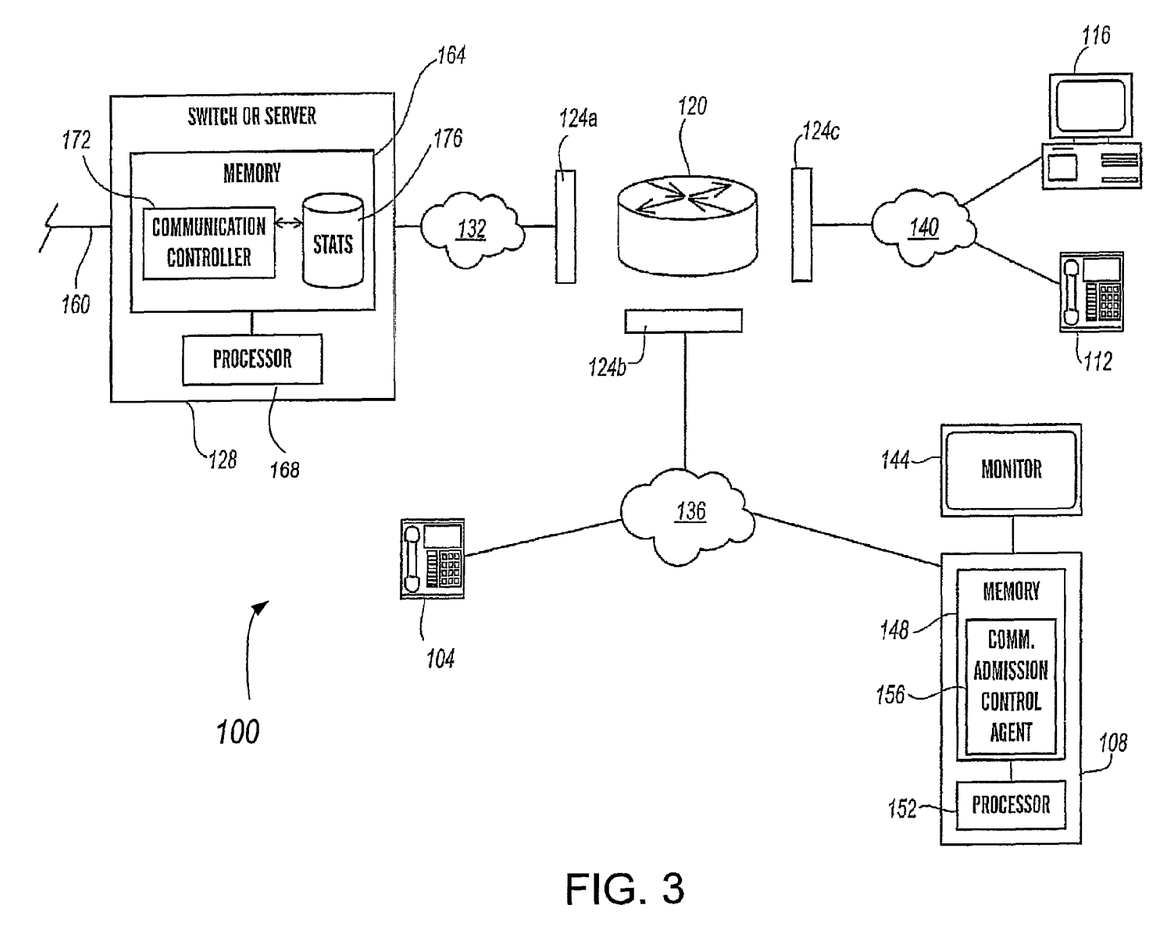
FIG. 3 depicts a VoIP network according to an example embodiment of the present invention.

FIG. 3 depicts a VoIP network according to an example embodiment of the present invention. The VoIP network 100 includes a first, second, third, and fourth endpoint 104, 108, 112 and 116, a router 120 having associated interfaces 124a-c, and a switch or media server 128. The various components are interconnected by first, second, and third subnets 132, 136, and 140, respectively, which collectively form a local area network (LAN).

For illustration purposes, the first and third endpoints 104 and 112 are configured as IP hard-phones, while the second and fourth endpoints 108 and 116 are configured as IP soft-phones. As will be appreciated, the various endpoints can be any communication device, such as a plain old telephone system (POTS), a soft phone, an IP hard phone, a personal or laptop computer, a PDA, a pager, and a wireless phone. VoIP network 100 can include any number of sub-networks and routers, depending on the application, and the subnets can form a network topology other than a LAN, such as a wide-area network (WAN), an enterprise network, and a metropolitan-area network.

Each of the endpoints 104, 108, 112 and 116 may include a main controller and a processor. The processor in an example may be a digital signal processor (DSP), a microprocessor, application specification integrated circuit (ASIC), field programmable gate array (FPGA), or any other equivalent discrete or integrated logic circuitry. As to be described in more detail hereafter, the DSP in the endpoint extracts four network quality parameters (packet delay, jitter, packet loss (PLC) and signal energy (SNR) information) as inputs to the main controller in order to determine a dynamic voice quality value for the endpoint. Specifically, the DSP extracts quality factors for each of delay, jitter, packet loss and signal level information (SNR), and corrections to these network parameters, from one or more algorithms, and sends the quality factors to the main controller. In the main controller, the quality factors are populated in a lookup table (LUT), from which the main controller determines the dynamic voice quality of the endpoint.

As depicted, the second endpoint 108 is a personal computer including a computer display monitor 144 and a computer comprising memory 148 and a processor 152. The memory 148 includes a communication admission control agent 156 to collect session-related information, such as latency, packet loss, jitter, available bandwidth, and jitter buffer delay to be used in determining whether or not a communication or call should be placed. As will be appreciated, the other endpoints 104, 112, 116 may include a communication admission control agent as well. Although the various endpoints are shown as subscribers to the switch or media server 128, one or more of the endpoints can be non-subscribers.

The switch or media server 128 can perform automatic communication routing functions to the various endpoints. The switch or media server 128 is connected to one or more communication lines 160 (e.g., telephone lines or trunks) over which it receives incoming contacts on the public switched telephone network or IP network. As will be appreciated, a "contact" can be any form, mode, or type of single media or multimedia communication, such as a wired or wireless live voice communication (whether circuit-switched or packet-switched), electronic mail, and video conferencing.

The switch or media server 128 can be any architecture for routing contacts to one or more endpoints. Illustratively, the switch or media server 128 of FIG. 3 can be one of a subscriber-premises equipment disclosed in U.S. Pat. Nos. 6,192,122, incorporate by reference in its entirety herein, Avaya Inc.'s Definity™ private-branch exchange (PBX)-based ACD system; and Nortel Networks' IPConnect™.

The switch or media server 128 typically is a stored-program-controlled system that conventionally includes interfaces to external communication links, a communications switching fabric, service circuits (e.g., tone generators, announcement circuits, etc.), memory 164 for storing control programs and data, and a processor 168 (i.e., a computer) for executing the stored control programs to control the interfaces and the fabric and to provide automatic contact-distribution functionality. Included in the memory 164 is a communication or call controller 172 to supervise the placement of contacts among subscribers, such as the first, second, third, and fourth endpoints 104, 108, 112, 116, and between a subscriber and a non-subscriber and a database 176 of performance metrics or bandwidth information collected during communications by subscribers.

To estimate end-to-end voice quality, the network impairments, acoustics, signal to noise ratio (SNR), and design and implementation of the VoIP system are considered. Therefore, to precisely measure voice quality of a particular endpoint or gateway on a live network, the dynamics of the phone system and network impairments are taken into consideration. As to be shown hereafter, the voice quality can be measured dynamically at the endpoints 104, 108, 112, 116.

Figure 4:
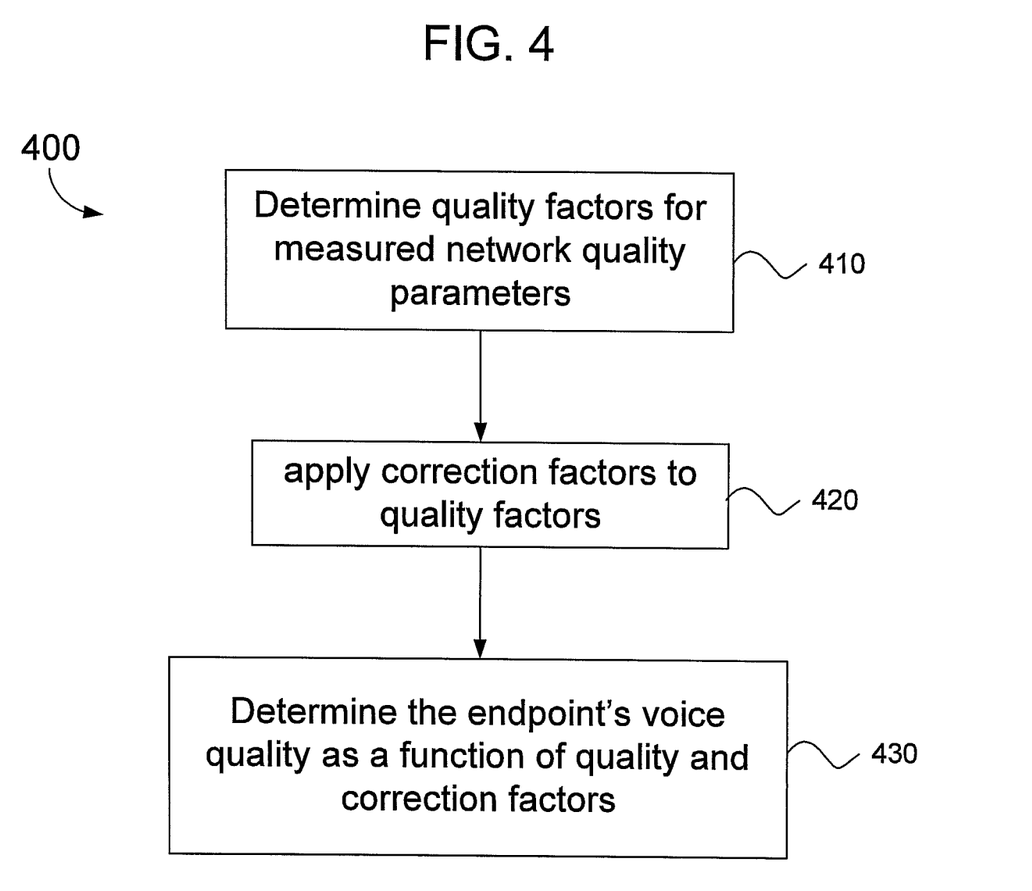
FIG. 4 is a flowchart for illustrating a method of measuring voice quality of an endpoint in a VoIP network.

FIG. 4 is a flowchart for illustrating a method of measuring voice quality of an endpoint in a VoIP network. All endpoints (such as endpoints 104, 108, 112, 116) can measure delay, jitter, packet loss and power level. This information can be used to monitor network and endpoint performance without additional effort. The example method uses four network quality parameters as inputs in order to determine a dynamic voice quality value for the endpoint.

Referring to FIG. 4, in method 400 a plurality of network parameters are measured (410) to determine quality factors. For example, the jitter buffer algorithm in the DSP of the endpoint measures delay, jitter and packet loss performance. The average power level measurement can be done in the linear domain by DSP (right after the decoder for every 10 milliseconds of speech).

The DSP further applies correction factors (420) to the quality factors determined is step 410. This calculation is also done by the jitter buffer algorithm in the DSP. The DSP sends the quality factors with correction factors to the main controller. Based on the following algorithm which takes delay, jitter, packet loss, signal power and laboratory measured data into consideration, a voice quality metric or value q(n) may be precisely measured (430) by the main controller software of the endpoint (104, 108, 112, 116) during the live call (i.e., in real-time):

$$q(n)=d(n)\times q_{delay}(n)+j(n)\times q_{jitter}(n)+p(n)\times q_{plc}(n)+e(n)\times q_{level}(n), \quad \text{Equation (2)}$$

where:

$q_{delay}(n)=q_d(\text{delay}(n))$, $d(n)$=Correction factor due to delay;

$q_{jitter}(n)=q_j(\text{jitter}(n))$, $j(n)$=Correction factor due to jitter;

$q_{plc}(n)=q_p(\text{plc}(n))$, $p(n)$=Correction factor due to packet loss;

$q_{level}(n)=q_s(\text{Signal\_Energy}(n))$, $e(n)$=Correction factor due to signal variation; and $q(n)$=Voice Quality.

In Equation (2), $q_d$ is the quality factor due to delay, $q_j$ is the quality factor due to jitter, $q_p$ is the quality factor due to packet loss and $q_s$ is the quality factor due to variation in signal level.

However, implementation of Equation (2) may be quite complicated. Instead, the following algorithm (Equation (3)) may be used to measure voice quality dynamically, i.e., in real time. This can be done using a particular endpoint in a controlled environment, and then measuring the endpoint's performance based on the above assumption(s). The results may be tabulated in a lookup table (LUT) that is stored in the memory of the main controller as a function of SNR, delay, jitter and signal energy. This is shown in Equation (3) below. Table 1 illustrates the contents of an example LUT stored in the main controller.

```
For 15 to 30 dB SNR (1 dB step) {                                      Equation (3)
    For 0 to 150 ms fixed delay (5 ms step) {
        For 0 to 100 ms jitter (5 ms step) {
            For 0 to 5% packet loss (step of 1) {
                q (delay, Jitter, SNR, Pack_Loss)
            }
        }
    }
}
```

TABLE 1

Example Contents in Lookup Table

| Voice Quality | Delay (0-100 ms) | Jitter (0-60 ms) | % Packet Loss (0-5%) | SNR (15-30 dB) |
|---|---|---|---|---|
| q(n) | delay(n) | jitter(n) | pl(n) | snr(n) |

Accordingly, Equation (3) shows that a voice quality value can be determined dynamically for the endpoint every 10 milliseconds. The example method and apparatus thus takes four network quality parameters as an input and then may select a predefined voice quality factor q from the LUT. This is implemented in the main controller software of any of the endpoints 104, 108, 112, 116 shown in FIG. 3. The q value is the representation of a voice quality metric determined by PESQ-LQ[1-3], which is a standardized voice quality measurement technique. The lookup table size could be further reduced by using curve fitting techniques.

Thus, each endpoint can have performance data as a function of network delay, signal levels, jitter, packet loss and the phone acoustics. There will be a unique look up table for each endpoint. The endpoint can transmit this data to the switch or media server 128. Based on the voice quality and network impairment, the switch or media server 128 can monitor the VoIP network 100 and the endpoint's performance on a dynamic or real-time basis. This voice quality and network performance data can be used by network engineers for network assessment, and engineers can use this data for remote voice quality analysis, i.e., without having to travel to a customer's site.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method of measuring or determining voice quality of an endpoint in a Voice-over-IP (VoIP) network. In one example, the computer-readable medium can include instructions that cause a programmable processor to determine a plurality of network quality parameters of an endpoint in the network, and to determine a voice quality factor for the endpoint in real time based on the network quality parameters. In another example, instructions can cause the processor to input a plurality of network quality parameters into a lookup table stored in the endpoint, and to select a predefined voice quality factor from the lookup table based on the inputs. Thus, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. An endpoint apparatus in a Voice-over-IP (VoIP) network, comprising:
    a processor in the endpoint apparatus in the VoIP network for determining quality factors including packet delay, jitter, packet loss and signal level at the endpoint apparatus in the VoIP network and applying any needed correction factors to the quality factors, and
    a controller in the endpoint apparatus in the VoIP network for determining a voice quality factor for the endpoint apparatus in the VoIP network in real time as the endpoint apparatus is making a live call on the VoIP network based on the quality factors with correction factors received from the processor, wherein the voice quality factor for the endpoint apparatus is determined using a lookup table or an algorithm.

2. The endpoint apparatus of claim 1, wherein
    the endpoint apparatus in the VoIP network includes the lookup table, and
    the controller determines the voice quality factor by accessing the lookup table using the determined packet delay, jitter, packet loss and signal level.

3. The endpoint apparatus in the VoIP network of claim 2, wherein the lookup table is unique to the endpoint apparatus in the VoIP network.

4. The endpoint apparatus in the VoIP network of claim 1, wherein the endpoint apparatus in the VoIP network is selected from a group consisting of an IP soft-phone, a plain old telephone system (POTS), a soft phone, an IP hard phone, a personal or laptop computer, a PDA, a pager and a wireless phone.

5. An endpoint apparatus in a Voice-over-IP (VoIP) network, comprising:
 a processor, and
 a controller having a lookup table stored therein, the lookup table being unique to the endpoint apparatus, wherein
 the processor inputs a plurality of network quality parameters, as modified by any correction factors, of the endpoint apparatus in the VoIP network into the lookup table, and
 the controller selects a predefined voice quality factor from the lookup table based on the inputs as the endpoint apparatus is making a live call on the VoIP network,
 wherein the plurality of network parameters comprise packet delay, jitter, packet loss and signal level, as modified by any correction factors.

6. A method of determining voice quality of an endpoint in a Voice-over-IP (VoIP) network, comprising:
 inputting data related to packet delay, jitter, packet loss and signal level of the endpoint, as modified by any correction factors, into a lookup table stored in the endpoint, and
 selecting a predefined voice quality factor from the lookup table based on the inputs as the endpoint is making a live call on the VoIP network.

7. The method of claim 6 wherein the lookup table is unique to the endpoint.

* * * * *